United States Patent [19]

Matsubayashi

[11] Patent Number: 5,550,329
[45] Date of Patent: Aug. 27, 1996

[54] APPARATUS FOR DRIVING A RESISTANCE FILM TYPE INPUT DEVICE

[75] Inventor: Katsuyoshi Matsubayashi, Yamanashi, Japan

[73] Assignee: NEC Corporation, Tokyo, Japan

[21] Appl. No.: 339,727

[22] Filed: Nov. 14, 1994

[30] Foreign Application Priority Data

Nov. 12, 1993 [JP] Japan .................................. 5-282874

[51] Int. Cl.⁶ ................................................ G08C 21/00
[52] U.S. Cl. ............................ 178/18; 178/19; 178/20; 345/173; 345/174
[58] Field of Search ................................ 178/18, 19, 20, 178/87; 345/156, 173, 174

[56] References Cited

U.S. PATENT DOCUMENTS

| | | | |
|---|---|---|---|
| 4,055,726 | 10/1977 | Turner et al. | 178/18 |
| 4,575,580 | 3/1986 | Jandrell | 178/18 |
| 4,594,589 | 6/1986 | Ohba et al. | 340/805 |
| 5,225,636 | 7/1993 | Protheroe | 178/18 |
| 5,266,750 | 11/1993 | Yatsuzuka | 178/19 |
| 5,324,895 | 6/1994 | Inamori et al. | 178/18 |
| 5,367,130 | 11/1994 | Isono | 178/18 |

*Primary Examiner*—Stephen Chin
*Assistant Examiner*—Paul Loomis
*Attorney, Agent, or Firm*—Sughrue, Mion, Zinn, Macpeak & Seas

[57] ABSTRACT

There are provided a first transistor for applying voltage to the Y-axis electrode, a second transistor for applying voltage to the Y-axis electrode and discharging electric charges accumulated at the Y-axis electrode, a third transistor for applying voltage to the X-axis electrode, and a fourth transistor for applying voltage to the X-axis electrode and discharging electric charges accumulated at the X-axis electrode. The voltage applied to the Y-axis electrode and the X-axis electrode during the waiting time are made to take the form of pulses, and when the voltages applied to the Y- and X-axis electrodes are simultaneously turned off, the Y- and X-axis electrodes are connected to the signal ground to discharge the electric charges accumulated at the Y- and X-axis electrodes. As a result, the coordinate deviation, which is caused by seasonal change of the resistance value by heat accumulation of the resistance film, can be prevented, and the erroneous detection of the coordinate, which is caused by the electric charges accumulated at the Y- and X-axis electrodes, can be prevented.

6 Claims, 2 Drawing Sheets

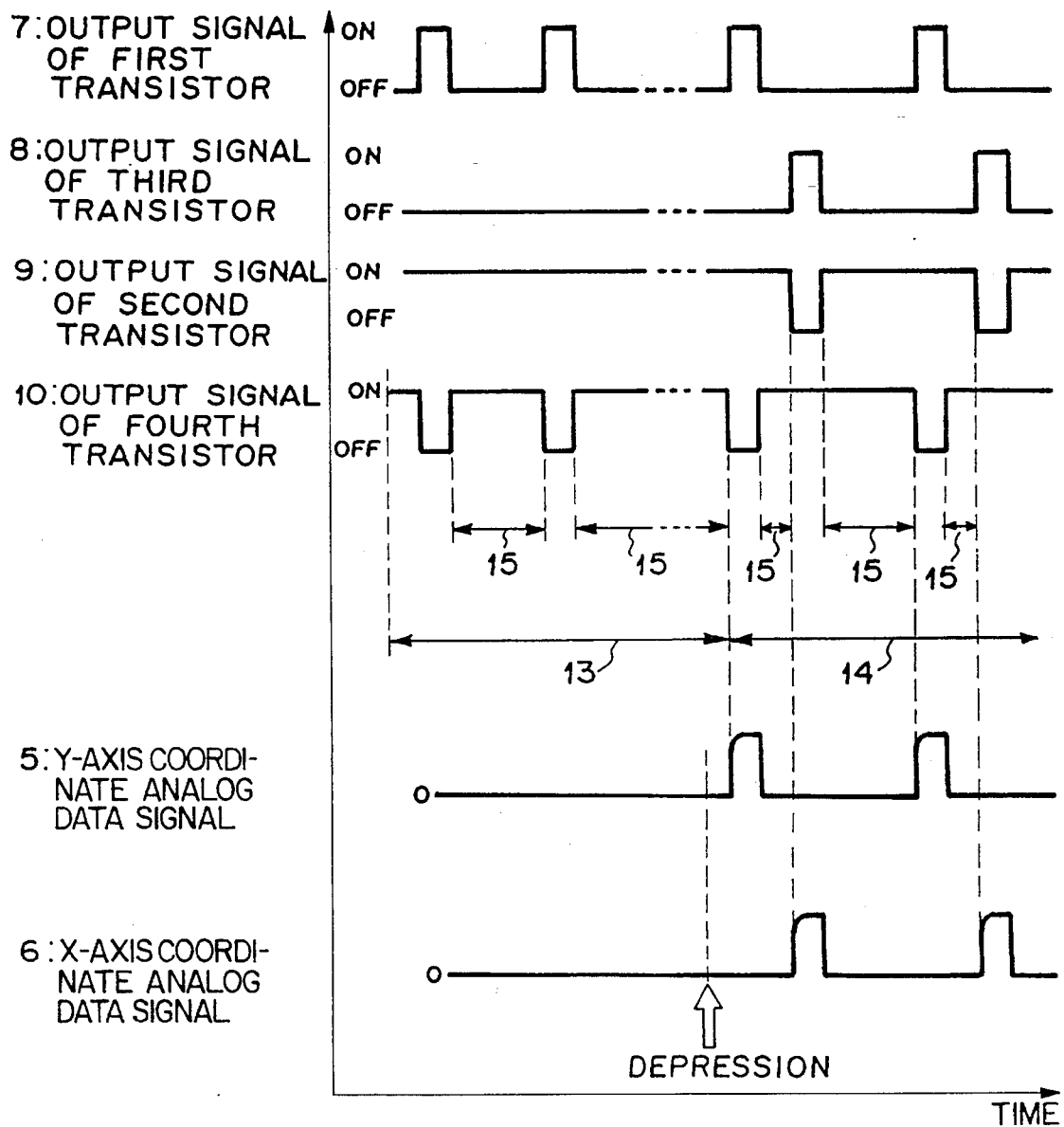

APPARATUS FOR DRIVING A RESISTANCE FILM TYPE INPUT DEVICE

FIELD OF THE INVENTION

The present invention relates to a driving apparatus adapted for a resistance film type input device and, in particular, to a driving apparatus which may prevent heat evolution of the resistance film type input device.

BACKGROUND OF THE INVENTION

Conventionally, in the resistance film type input device, in order to know which of the X-Y coordinates are depressed, two transparent films, each for X- and Y-axis, are disposed overlapped on, for example, the surface of the cathode ray tube. Each resistance film is provided with an electrode at its end portion. A predetermined current adapted for the X-axis is previously made to flow from one electrode to the other, and if the film is depressed, then the voltage at that depressed point which corresponds to the current which had been flowing for the X-axis is sensed to the resistance film adapted for the Y-axis to detect that voltage from the electrode adapted for the Y-axis. Then, which point on the X-axis was depressed can be known by that voltage to detect the X-coordinate according to the voltage generated at the Y-axis electrode.

While the film is being depressed (the period of time during which the film is depressed once is typically several tens of milliseconds), a predetermined current adapted for the Y-axis is also made to flow to detect the Y-coordinate of the depressed point according to the voltage generated at the X-axis electrode. Thus, the X-Y coordinate of the depressed point is detected.

An input detection means of the conventional input device using the resistance film adopts a system in which the DC voltage is always applied to the Y-axis electrode to detect the depression. For this case, the temperature of the resistance film is elevated, and the resistance value of the portion of the resistance film where the temperature is elevated is changed with age and the coordinate deviation which is caused by the change of the detected voltage occurs due to the change of the resistance value in two years or so after it begins to be used. Therefore, it is replaced with new one in the cycle of about two years.

Further, the resistance film is not only resistance film, but also is comprised of two resistance films in order to detect X- and Y-axes, and also has a characteristic as a capacitor having a charging capacitance. Therefore, if only the pulse voltages is simply applied as the driving voltage, electric charges charged to the X- and Y-electrodes cannot escape, and the coordinate is detected by error by the residual voltage.

As described above, in the conventional resistance film type input device, since the DC current is constantly applied while the input is waited for (during the waiting time), the resistance film accumulates heat and the resistance value is changed with age causing the coordinate deviation. Therefore, it must be replaced with new one in the cycle of about two years.

Further, it also has a disadvantage that the coordinate is detected by error by the electric charges remaining on the Y-axis electrode and on the X-axis electrode.

It is, then, an object of the present invention to provide a resistance film type input device for improving the operation of adapting for each electrode.

SUMMARY OF THE INVENTION

The present invention relates to a driving apparatus adapted for a resistance film type input device which is used to specify the particular position on the X-Y coordinate. In this resistance film type, transparent resistance films are spread on the cathode ray tube each one for X- and Y-axes. The number of the transistors is four in all, and if the current is turned on to, for example, the Y-axis and the film is depressed, a voltage corresponding to the resistance value at the depressed point is output from the X-axis and it can be known which point on the Y-axis it corresponds to. Immediately after that, by following the reverse procedure, it is detected which point on the X-axis it corresponds to, and the X-axis coordinate is detected.

A first driving apparatus adapted for the resistance film type input device according to the present invention comprises a first transistor for applying the voltage to the Y-axis electrode, a second transistor for applying the voltage to the Y-axis electrode and discharging the electric charges accumulated at the Y-axis electrode, a third transistor for applying the voltage to the X-axis electrode and a fourth transistor for applying the voltage to the X-axis electrode and discharging electric charges accumulated at the X-axis electrode, and the voltage applied to the X-axis electrode and the Y-axis electrode during the waiting time is set to the pulse-form.

A second driving apparatus adapted for the resistance film type input device according to the present invention comprises a first transistor for applying voltage to the Y-axis electrode, a second transistor for applying the voltage to the Y-axis electrode and discharging electric charges accumulated at the Y-axis electrode, a third transistor for applying the voltage to the X-axis electrode and a fourth transistor for applying the voltage to the X-axis electrode and discharging electric charges accumulated at the X-axis electrode, and when the voltages each applied to the Y-axis electrode and the X-axis electrode are simultaneously turned off, the X-axis electrode and the Y-axis electrode are connected each to the signal ground to discharge the electric charges accumulated at the Y-axis electrode and the X-axis electrode.

According to the present invention, a resistance film type input device having an X-axis resistance film and a Y-axis resistance film overlapped vertically, the input device comprising a first switch having a first control terminal for applying the voltage to one of said Y-axis electrode, a second switch having a second control terminal at the other of the Y-axis electrode for absorbing the charging voltage to the ground, a third switch having a third control terminal for applying the voltage to on of said X-axis electrode, and a fourth switch having a fourth control terminal at the other of the X-axis electrode for absorbing the charging voltage to the ground, wherein during the input waiting time, the second or fourth switch being turned on, and during the time when the film is depressed, the first and second switches being simultaneously turned on to detect the depressed point from the electrode of the fourth switch.

BRIEF DESCRIPTION OF THE DRAWINGS

FIG. 2 is a waveform diagram illustrating the operation of the embodiment of FIG. 1.

DESCRIPTION OF THE PREFERRED EMBODIMENT OF THE INVENTION

Figure 1:
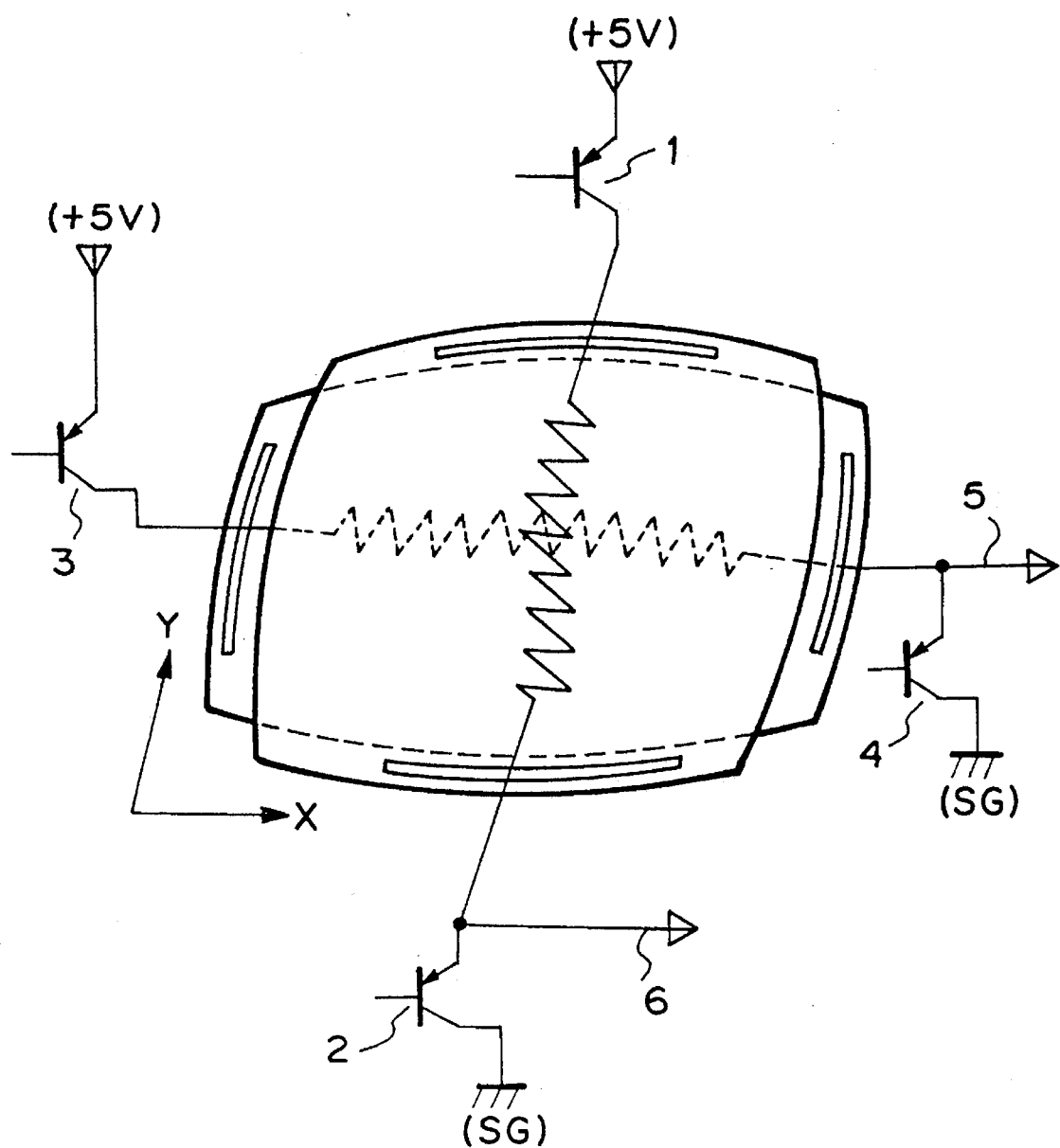
FIG. 1 is a circuit diagram illustrating a specific embodiment of the present invention.

A specific embodiment of the present invention is hereinafter described with reference to the accompanying drawings.

In FIG. 1, the first transistor 1 as a first switch is one for applying voltage to the Y-axis electrode. The second transistor 2 as a second switch is one for applying voltage to the Y-axis electrode and discharging the electric charges accumulated at the Y-axis electrode for a short period of time. The third transistor 3 as a third switch is one for applying voltage to the X-axis electrode. The fourth transistor 4 as a fourth switch is one for applying voltage to the X-axis electrode and discharging the electric charges accumulated at the X-axis electrode for a short period of time.

An output signal 7 shown in FIG. 2 is output from the first transistor 1, and an output signal 8 is output from the third transistor 3, an output signal 9 is output from the second transistor 2 and an output signal 10 is output from the fourth transistor 4.

The period of time during which the resistance film is not depressed is set to the waiting time 13, during which the base of the second transistor 2 applies the ground or negative voltage so as to constantly turn it on. If the electric charges are present at the resistance film adapted for the Y-axis, those electric charges are dropped off to the ground to be absorbed and to be discharged. Further, or the pulse-shaped voltage of less (5–0.6) Volts or the ground voltage is applied to the base of the first transistor 1, and the pulse-shaped voltage of +5 V from the source voltages is applied to the Y-axis electrode of the collector of the first transistor 1. While this +5 V is being applied, if the film is depressed, then since the third and fourth transistors 4 are turned off, a pulsed voltage corresponding to the voltage of the depressed point on the Y-axis resistance film is induced to the emitter of the fourth transistor by the depression of the film. A microcomputer which is connected to the emitter of the fourth transistor and has sensed this induced voltage sets the following time as the input detection time 14.

Further, this induced voltage is detected as the Y-coordinate analog data signal 5 to be output to the emitter of the fourth transistor 4. After that, with the first and second transistors 1, 2 turned off and with the third and fourth transistors 3, 4 turned on, an induced pulse voltage corresponding to the voltage of the above same depressed point on the X-axis resistance film is induced to the emitter of the second transistor 2 by depression of the resistance film. This induced voltage is detected as the X-coordinate analog data signal 6 to be output to the emitter of the second transistor 2.

The detected Y-coordinate analog data signal 5 and the X-coordinate analog data signal 6 are converted to the digital signal by the following stage A/D converter to be sent to the microcomputer as the digital coordinate data.

Therefore, again describing in other words, the Y-coordinate value of the depressed point is detected from the Y-coordinate digital signal of the Y-coordinate analog data signal 5 which corresponds to the level of the foregoing induced voltage. Immediately after that, in order to stop the application of the voltage to the Y-axis resistance film, with the first and second transistors 1, 2 turned off and with the third and fourth transistors 3, 4 turned on, a pulse voltage is applied to the X-axis resistance film, and the induced pulse voltage corresponding to the voltage of the depressed point is output from the emitter of the second transistor 2. This induced pulse voltage is the X-coordinate analog data signal 6, which is entered to the microcomputer via the A/D converter. Thus, the value of the X-coordinate of the depressed point can be detected by the level of this X-coordinate digital signal.

When the pulse voltage is applied, during the voltage-free time 15 during which no voltage is applied to the X- and Y-axis electrodes, with the second and/or the fourth transistors 2, 4 turned on, electric charges accumulated between the two resistance films (X-axis electrode and Y-axis electrode) are discharged to the signal ground (SG).

Incidentally, in the foregoing embodiment, although a case in which the second transistor adapted for the Y-axis resistance film is turned on during the voltage-free time is described, if the electric charges are accumulated between the X- and Y-resistance films, the rise of temperature which is caused by the accumulation of electric charges can be suppressed by discharging the electric charges on one resistance film, and the accumulated electric charges can be completely discharged by discharging those of both resistance films. For that manner, the second transistor as the second switch and/or the fourth transistor as the fourth switch turn on during the waiting time 15. In this case, any one of the X- and Y-axis resistance films may be discharged of the electric charges.

As described above, the driving apparatus adapted for the resistance film type input device according to the present invention comprises a first transistor for applying the source voltage to the Y-axis electrode, a second transistor for applying the voltage corresponding to the resistor of the resistance film to the Y-axis electrode and discharging the electric charges accumulated at the Y-axis electrode, a third transistor for applying the source voltage to the X-axis electrode, and a fourth transistor for applying the voltage corresponding to the resistor of the resistance film to the X-axis electrode and discharging electric charges accumulated at the X-axis electrode. The voltages applied to the Y- and X-axis electrodes during the waiting time are made to take the form of pulses.

When the voltages applied to the Y- an X-axis electrodes are simultaneously turned off, the Y- and X-axis electrodes are connected to the signal ground to discharge the electric charges accumulated at the Y- and X-axis electrodes to prevent the coordinate deviation (which is caused by the seasonal change of the resistance value of the resistance film by accumulation of heat) from occurring.

Further, there is also an advantage that erroneous detection of the coordinates can be prevented by the electric charges accumulated at the Y- and X-axis electrodes.

While this invention has been particularly shown and described with reference to the preferred embodiment thereof, it will be understood that various changes in form and details may be made therein without departing from the spirit and scope of the invention.

What is claimed is:

1. An input device comprising:
    a Y-axis resistance film having a first Y-axis electrode formed on one side thereof and a second Y-axis electrode on the opposite side thereof;
    an X-axis resistance film having a first X-axis electrode formed on one side thereof and a second X-axis electrode on the opposite side thereof, wherein said resistance films are in a superposed relation so that said resistance films are in contact with each other when pressure is applied to any point on one of said resistance films;
    a first transistor connecting a first voltage source to said first Y-axis electrode, said first transistor being intermittently turned ON to apply a voltage from said first voltage source to said first Y-axis electrode;

a second transistor connecting a first signal ground to said second Y-axis electrode;

a third transistor connecting a second voltage source to said first X-axis electrode, said third transistor being intermittently turned ON to apply said second voltage to said first X-axis electrode;

a fourth transistor connecting a second signal ground to said second X-axis electrode, wherein said second transistor is turned ON by a pulse-shaped voltage to discharge residual electric charges accumulated on said first and second Y-axis electrodes when said third transistor is OFF, and wherein said fourth transistor is turned ON to discharge residual electric charges accumulated on said first and second X-axis electrodes when said first transistor is OFF.

2. The input device of claim 1, wherein during a waiting period before said contact, said third transistor is always OFF and said second transistor is always ON to discharge said residual electric charges accumulated on said first and second Y-axis electrodes.

3. The input device of claim 1, wherein during a detection period after said contact, a Y-coordinate of said contact is calculated according to an induced voltage detected at said fourth transistor.

4. The input device of claim 3, wherein after calculating said Y-coordinate of said contact, an X-coordinate of said contact is calculated according to an induced voltage detected at said second transistor.

5. The input device of claim 1, wherein said second transistor is desynchronized with said first transistor.

6. The input device of claim 1, wherein said fourth transistor is desynchronized with said third transistor.

* * * * *